US012562923B2

(12) United States Patent
Silverman

(10) Patent No.: US 12,562,923 B2
(45) Date of Patent: Feb. 24, 2026

(54) DIGITAL-ASSET AUTHENTICATION WITH ANONYMITY

(71) Applicant: Veracity, Inc., Novato, CA (US)

(72) Inventor: Shmuel Silverman, Novato, CA (US)

( * ) Notice: Subject to any disclaimer, the term of this patent is extended or adjusted under 35 U.S.C. 154(b) by 133 days.

(21) Appl. No.: 18/533,124

(22) Filed: Dec. 7, 2023

(65) Prior Publication Data

US 2024/0195639 A1 Jun. 13, 2024

Related U.S. Application Data

(60) Provisional application No. 63/431,023, filed on Dec. 8, 2022.

(51) Int. Cl.
H04L 9/32 (2006.01)
(52) U.S. Cl.
CPC .......... H04L 9/3271 (2013.01); H04L 9/3231 (2013.01); H04L 9/3236 (2013.01)
(58) Field of Classification Search
CPC .... H04L 9/3271; H04L 9/3231; H04L 9/3236
See application file for complete search history.

(56) References Cited

U.S. PATENT DOCUMENTS

| | | | |
|---|---|---|---|
| 10,885,220 B2 * | 1/2021 | Sharma ................. | H04L 63/083 |
| 11,641,368 B1 * | 5/2023 | Shah ..................... | H04L 63/083 |
| | | | 726/6 |

| | | | |
|---|---|---|---|
| 2009/0061820 A1 * | 3/2009 | Patel ................... | H04L 63/0869 |
| | | | 455/411 |
| 2013/0191899 A1 * | 7/2013 | Eldefrawy ............ | H04L 9/3228 |
| | | | 726/6 |
| 2019/0295114 A1 * | 9/2019 | Pavletic ................ | G06F 18/214 |
| 2020/0359212 A1 * | 11/2020 | Chen .................... | H04L 63/102 |
| 2022/0138304 A1 * | 5/2022 | Wattiau ................. | G06F 21/34 |
| | | | 726/18 |
| 2024/0171410 A1 * | 5/2024 | Arora ................... | H04L 9/3271 |

OTHER PUBLICATIONS

Marwa Mouallem and Ittay Eyal. 2024. Asynchronous Authentication. In Proceedings of the 2024 on ACM SIGSAC Conference on Computer and Communications Security (CCS '24). Association for Computing Machinery, New York, NY, USA, 3257-3271. (Year: 2024).*

(Continued)

*Primary Examiner* — Kari L Schmidt
(74) *Attorney, Agent, or Firm* — Steven Stupp

(57) ABSTRACT

During operation, a digital asset (such as a digital file or a token) on an electronic device receives, from the electronic device, a vector of challenges, where the vector of challenges includes N challenges and N is a non-zero integer. Then, the digital asset selects a subset of the vector of challenges. Moreover, the digital asset compares the subset of the vector of challenges with a stored second subset of a second vector of challenges. When the subset of the vector challenges matches the stored second subset of the second vector of challenges: the digital asset deems the electronic device authenticated; the digital asset provides, to the electronic device, a third vector of challenges, where the third vector of challenges includes M challenges and M is a non-zero integer; and the electronic device selects and stores a third subset of the third vector of challenges.

20 Claims, 15 Drawing Sheets

(56) References Cited

OTHER PUBLICATIONS

Antonio Muñoz. 2022. Secure Mobile Agents on Embedded Boards: a TPM based solution. In Proceedings of the 17th International Conference on Availability, Reliability and Security (ARES '22). Association for Computing Machinery, New York, NY, USA, Article 104, 1-7. (Year: 2022).*

R. F. Olanrewaju, B. U. I. Khan, M. A. Morshidi, F. Anwar and M. L. B. M. Kiah, "A Frictionless and Secure User Authentication in Web-Based Premium Applications," in IEEE Access, vol. 9, pp. 129240-129255, 2021. (Year: 2021).*

* cited by examiner

Eliminating the Man-in-Middle

DIGITAL-ASSET AUTHENTICATION WITH ANONYMITY

CROSS REFERENCE TO RELATED APPLICATIONS

This application claims priority under 35 U.S.C. 119(e) to U.S. Provisional Application Ser. No. 63/431,023, entitled "MITM-Resilient Protocol," by Shmuel Silverman, filed on Dec. 8, 2022, the contents of which are herein incorporated by reference.

FIELD

The described embodiments relate to techniques for authentication. Notably, the described embodiments relate to securely authenticating an individual via an electronic device associated with the individual, and/or a digital asset (such as a file) associated with the individual while preserving anonymity of the individual.

BACKGROUND

Barcode scanning is a simple and quick way to authenticate users to websites, applications, and computers. Consequently, barcode scanning is available on a wide variety of electronic devices, such as cellular telephones, tablets and computers.

Moreover, two-factor authentication (2FA), and more generally multi-factor authentication (MFA), is a security process that cross-verifies users with two different forms of identification. For example, 2FA may include an email address and proof of ownership of a cellular telephone, such as a numerical code that is received via a separate communication channel (such as a text message).

However, these and other existing authentication techniques are typically susceptible to so-called man-in-the-middle (MITM) attacks, in which a third party intercepts authentication information and subsequently uses the authentication information for fraudulent access to electronic devices and/or computers. Alternatively, in an MITM attack, the third party may modify the communicated authentication information, thereby disrupting the authentication process. Furthermore, existing authentication techniques are usually based on the identity of a user. Consequently, existing authentication techniques often do not protect user anonymity or privacy.

SUMMARY

An electronic device that selectively performs authentication is described. This electronic device may include: an interface circuit that communicates with a second electronic device: a computation device (such as a processor) that executes program instructions: and memory that stores the program instructions. During operation, the electronic device accesses an object in the electronic device. Then, the electronic device provides, to the second electronic device, an identifier associated with the object. Moreover, the electronic device receives, from the second electronic device, a token associated with the identifier. Next, the electronic device provides, to a third electronic device or a digital asset in the electronic device, the token and security information. Furthermore, the electronic device provides, to the third electronic device or the digital asset in the electronic device, a vector of challenges, where the vector of challenges includes N challenges and N is a non-zero integer. Note that the vector of challenges may be secured using the security information.

In some embodiments, when the electronic device subsequently authenticates with the third electronic device or the digital asset, the electronic device provides, to the third electronic device or the digital asset, a second vector of challenges, where the second vector of challenges includes M challenges, M is a non-zero integer, and a subset of the second vector of challenges matches a subset of the vector of challenges. Then, the electronic device may receive, from the third electronic device or the digital asset, a third vector of challenges. Next, the electronic device selects and stores a second subset of the third vector of challenges for use in subsequent authentication of the third electronic device or the digital asset. Moreover, in some embodiments, before selecting and storing the second subset of the third vector of challenges, the electronic device may compute a fourth vector of challenges based at least in part on the third vector of challenges and the security information. Furthermore, in some embodiments, the third vector of challenges is based at least in part on a biological identifier of an individual (such as a user).

Note that the identifier may include a serial number.

Moreover, the digital asset may include a digital file.

Furthermore, the token and the security information are provided via a tunnel.

Additionally, the security information may include or may specify a hash function or an encryption key.

In some embodiments, the second electronic device may include an authentication server.

Note that the object may include a cookie.

Another embodiment provides the second electronic device, which perform counterpart operations to at least some of the aforementioned operations.

Another embodiment provides the digital asset or the third electronic device, which perform counterpart operations to at least some of the aforementioned operations. During operation, when the digital asset or the third electronic device receives the vector of challenges, the digital asset or the third electronic device computes the second vector of challenges based at least in part on the second vector of challenges and the security information. Then, the digital asset or the third electronic device selects and stores the subset of the vector challenges. Moreover, in some embodiments, the second vector of challenges is computed based at least in part on the biological identifier of the individual.

Another embodiment provides a computer-readable storage medium for use with the electronic device, the second electronic device or the third electronic device. When executed by the electronic device, the second electronic device or the third electronic device, this computer-readable storage medium causes the electronic device, the second electronic device or the third electronic device to perform at least some of the aforementioned operations or counterpart operations.

Another embodiment provides a method, which may be performed by the electronic device, the second electronic device or the third electronic device. This method includes at least some of the aforementioned operations or counterpart operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
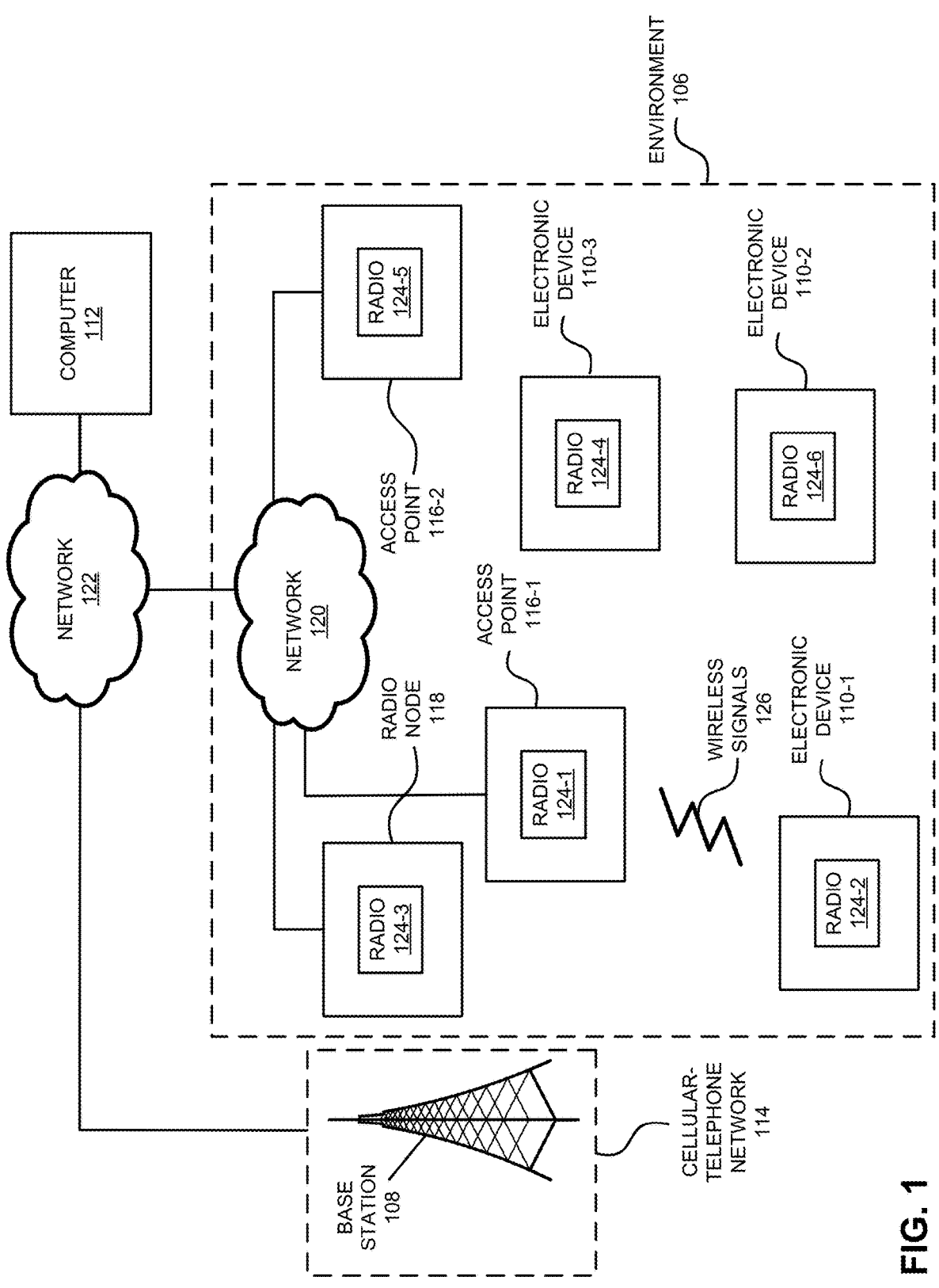
FIG. 1 is a block diagram illustrating an example of communication among electronic devices in a system in accordance with an embodiment of the present disclosure.

An electronic device that selectively performs authentication is described. During operation, the electronic device may access an object in the electronic device. Then, the electronic device may provide, to the second electronic device, an identifier associated with the object. Moreover, the electronic device may receive, from the second electronic device, a token associated with the identifier. Next, the electronic device may provide, to a third electronic device or a digital asset in the electronic device, the token and security information. Furthermore, the electronic device may provide, to the third electronic device or the digital asset in the electronic device, a vector of challenges, where the vector of challenges includes N challenges and N is a non-zero integer.

Moreover, a digital asset on an electronic device or a third electronic device that selectively performs authentication is described. During operation, when the electronic device authenticates with the third electronic device or the digital asset, the electronic device may provide, to the third electronic device or the digital asset, a second vector of challenges, where the second vector of challenges includes M challenges, M is a non-zero integer, and a subset of the second vector of challenges matches a subset of the vector of challenges. Then, the electronic device may receive, from the third electronic device or the digital asset, a third vector of challenges. Next, the electronic device may select and store a second subset of the third vector of challenges for use in subsequent authentication of the third electronic device or the digital asset. Moreover, in some embodiments, before selecting and storing the second subset of the third vector of challenges, the electronic device may compute the third vector of challenges based at least in part on the second vector of challenges and the security information. Furthermore, in some embodiments, the third vector of challenges may be based at least in part on a biological identifier of an individual (such as a user).

By selectively performing authentication, these authentication techniques may provide the advantages of authenticating without compromising privacy of the individual. Notably, identification of the individual is not needed in the authentication techniques. Consequently, the authentication techniques may provide secure and private approach for authentication of the digital asset, the electronic device or the third electronic device, which may enable selective access to resources (such as a computer network) or conducting or a transaction without requiring that the individual compromise their privacy. Therefore, the authentication techniques may improve the user experience, which may facilitate adoption of the authentication techniques.

We now describe embodiments of the authentication techniques. In the discussion that follows, Long Term Evolution or LTE (from the 3rd Generation Partnership Project of Sophia Antipolis, Valbonne, France) is used as an illustration of a data communication protocol that is used one or more radio nodes in a cellular-telephone network. The one or more radio nodes may facilitate communication in the authentication techniques between a computer or a server, an electronic device associated with a user (such as the individual) and/or one or more other electronic devices. Consequently, the one or more radio nodes may include an Evolved Node B (eNodeB) or eNBs. In some embodiments, the communication protocol used by the one or more radio nodes may include: a third generation or 3G communication protocol, a fourth generation or 4G communication protocol, e.g., LTE, LTE Advanced or LTE-A, a fifth generation or 5G communication protocol, or other present or future developed advanced cellular communication protocol. Therefore, in other embodiments, the one or more radio nodes may include: a Universal Mobile Telecommunications System (UMTS) NodeB and radio network controller (RNC), or a New Radio (NR) gNB or gNodeB (which communicate with a network with a cellular-telephone communication protocol that is other than LTE).

Alternatively or additionally, an Institute of Electrical and Electronics Engineers (IEEE) 802.11 standard (which is sometimes referred to as 'Wi-Fi,' from the Wi-Fi Alliance of Austin, Texas) is used as an illustration of a communication protocol that is used by an access point in a wireless local area network (WLAN) to facilitate the communication between the computer or the server, the electronic device and/or the one or more other electronic devices. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. However, a wide variety of communication techniques or protocols may be readily used in various embodiments. For example, an electronic device and a radio node or an access point may communicate frames or packets in accordance with a wireless communication protocol, such as: Bluetooth (from the Bluetooth Special Interest Group of Kirkland, Washington), and/or another type of wireless interface.

Moreover, a radio node or the access point may communicate with other access points, radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication in an environment 106 with one or more electronic devices 110 (such as cellular telephones, portable electronic devices, stations or clients, another type of electronic device, etc.) via a cellular-telephone network 114 (which may include a base station 108), one or more access points 116 (which may communicate using Wi-Fi) in a WLAN and/or one or more radio nodes in a network (such as radio node 118), which may communicate using LTE (such as a small cell or a cellular-telephone network). In the discussion that follows, an access point, a radio node or a base station are sometimes referred to generically as a 'communication device.' Moreover, as noted previously, one or more base stations (such as base station 108), access points 116, and/or radio node 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio node 118 may communicate with each other and/or computer 112 (which may be a cloud-based computer or server) using a wired communication protocol (such as Ethernet) via network 120 and/or 122. Note that networks 120 and 122 may be the same or different networks. For example, networks 120 and/or 122 may an LAN, an intra-net or the Internet.

Figure 15:
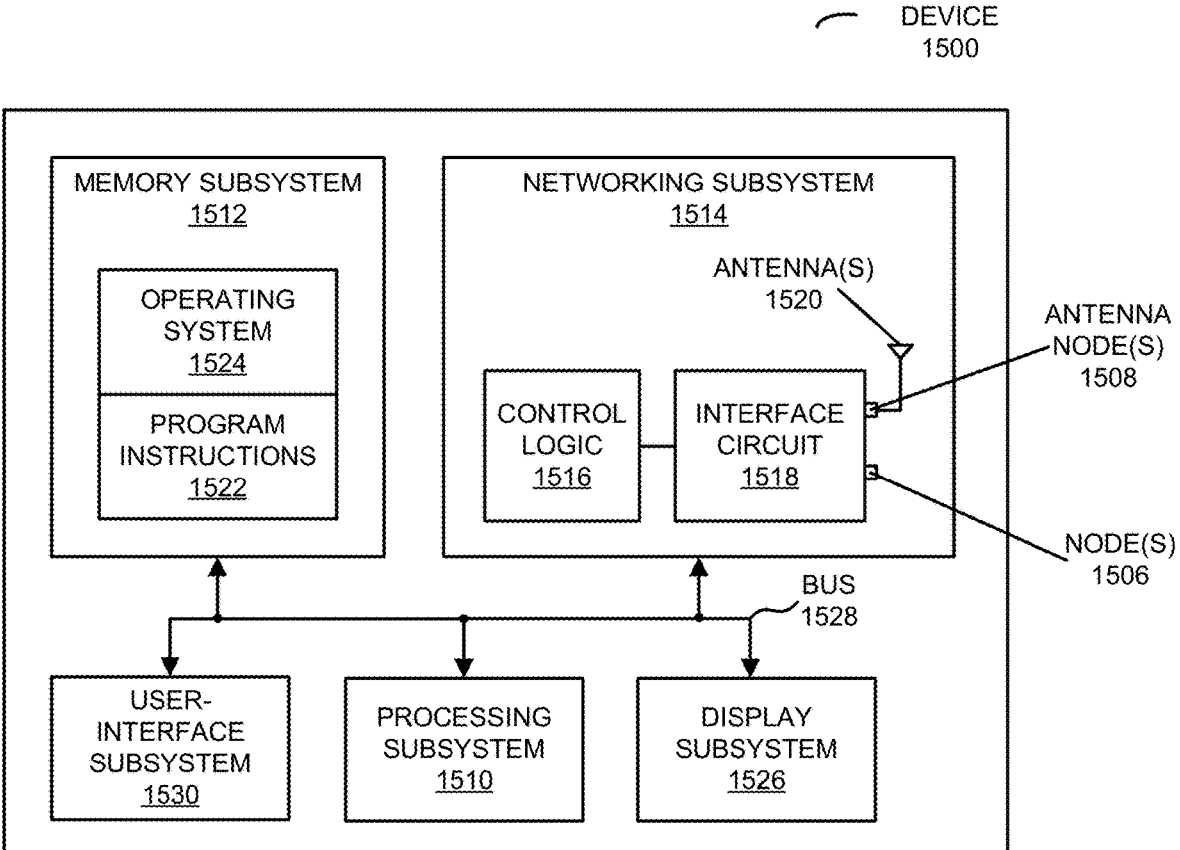
FIG. 15 is a block diagram illustrating an example of an electronic device in accordance with an embodiment of the present disclosure.

As described further below with reference to FIG. 15, electronic devices 110, computer 112, access points 116, and radio node 118 may include subsystems, such as a networking subsystem, a memory subsystem and a processor subsystem. In addition, electronic devices 110, access points 116 and radio node 118 may include radios 124 in the networking subsystems. More generally, electronic devices 110, access points 116 and radio node 118 can include (or can be included within) any electronic devices with the networking subsystems that enable electronic devices 110, access points 116 and radio node 118 to wirelessly communicate with one or more other electronic devices. This wireless communication may include transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio node 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio node 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio node 118 and electronic devices 110 may include: receiving the wireless signals with the packet or the frame: decoding/extracting the packet or the frame from the received wireless signals to acquire the packet or the frame: and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHZ, 2.4 GHZ, 5 GHZ, 6 GHz, 60 GHz, the Citizens Broadband Radio Spectrum or CBRS (e.g., a frequency band near 3.5 GHZ), and/or a band of frequencies used by LTE or another cellular-telephone communication protocol or a data communication protocol. Note that the communication between electronic devices may use multi-user transmission (such as orthogonal frequency division multiple access or OFDMA).

Although we describe the network environment shown in FIG. 1 as an example, in alternative embodiments, different numbers or types of electronic devices may be present. For example, some embodiments include more or fewer electronic devices. As another example, in another embodiment, different electronic devices are transmitting and/or receiving packets or frames.

As discussed previously, it can be difficult to authenticate an individual (e.g., during a transaction between electronic devices 110-1 and 110-2) without compromising the privacy of the individual. As described further below with reference to FIGS. 2-14, in order to address these problems, electronic devices 110-1, 110-2 and/or 110-3 may perform an embodiment of the authentication techniques.

Notably, electronic device 110-1 may access an object (such as a cookie or a token) in electronic device 110-1. Then, electronic device 110-1 may provide, to computer 112 (such as an authentication server), an identifier (such as a serial number) associated with the object. Moreover, computer 112 may provide, to electronic device 110-1, a token (such as an authentication token) associated with the identifier. Next, electronic device 110-1 may provide, to electronic device 110-2 or a digital asset (such as a digital file) in electronic device 110-1, the token and security information (which may include or may specify a hash function or an encryption key). Note that the token and the security information may be provided via a tunnel. Furthermore, electronic device 110-1 may provide, to electronic device 110-1 or the digital asset in electronic device 110-1, a vector of challenges, where the vector of challenges includes N challenges and N is a non-zero integer. Note that the vector of challenges may be secured using the security information.

In some embodiments, when electronic device 110-1 subsequently authenticates with electronic device 110-2 or the digital asset, electronic device 110-1 may provide, to electronic device 110-2 or the digital asset, a second vector of challenges, where the second vector of challenges includes M challenges, M is a non-zero integer, and a subset of the second vector of challenges matches a subset of the vector of challenges. Then, electronic device 110-1 may receive, from electronic device 110-2 or the digital asset, a third vector of challenges. Next, electronic device 110-1 may select and store a second subset of the third vector of challenges for use in subsequent authentication of electronic device 110-2 or the digital asset. Moreover, in some embodiments, before selecting and storing the second subset of the third vector of challenges, electronic device 110-1 may compute a fourth vector of challenges based at least in part on the third vector of challenges and the security information. For example, the fourth vector of challenges may be a decrypted version of the third vector of challenges. Furthermore, in some embodiments, the third vector of challenges is based at least in part on a biological identifier of an individual (such as a user).

The digital asset or electronic device 110-2 may perform counterpart operations to at least some of the aforementioned operations of electronic device 110-1. For example, during operation, when the digital asset or electronic device 110-2 receives the vector of challenges, the digital asset or electronic device 110-2 may compute the second vector of challenges based at least in part on the vector of challenges and the security information. Then, the digital asset or electronic device 110-2 may select and store the subset of the vector challenges. Moreover, in some embodiments, the second vector of challenges may be computed based at least in part on the biological identifier of the individual.

In this way, the authentication techniques may the allow any of electronic devices 110 or a digital asset (such as a file) on any of electronic devices 110 to be authenticated without compromising privacy of the individual (who may be a user of one of electronic devices 110). Moreover, these authentication techniques may be performed seamless by electronic devices in a network without requiring action by the individual. Furthermore, the information may be exchanged continuously, so that the authentication techniques can provide robust and secure authentication. Additionally, by not exchanging, storing or using information that, directly or indirectly, can be used to identify the individual, the authentication techniques may significantly improve or eliminate risks to privacy and sensitive information during authentication.

While the preceding discussion illustrated the authentication techniques using interaction among electronic devices 110, in other embodiments at least some of the described operations are performed locally and/or remotely (e.g., using computer 112). Consequently, in some embodiments, the authentication techniques are implemented using a centralized and/or a distributed approach. For example, the authentication techniques may be implemented using a client-server architecture, such as using electronic device 110-1 and computer 112. Alternatively, at least some of the operations in the authentication techniques may be performed by electronic device 110-1.

Figure 2:
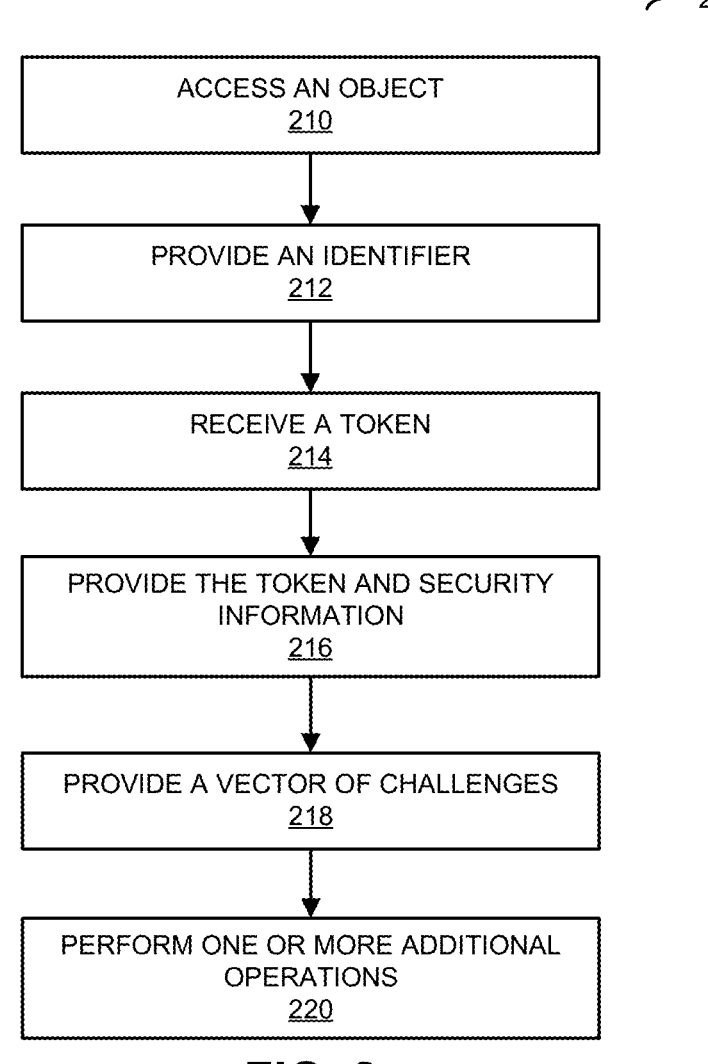
FIG. 2 is a flow diagram illustrating an example of a method for selectively performing authentication using an electronic device in FIG. 1 in accordance with an embodiment of the present disclosure.

We now describe embodiments of the method. FIG. 2 presents a flow diagram illustrating an example of a method 200 for selectively performing authentication, which may be performed by an electronic device (such as electronic device 110-1 in FIG. 1). During operation, the electronic device may access an object (operation 210) in the electronic device. For example, the electronic device may access the object to obtain an identifier associated with the object. Note that the object may include a cookie. Then, the electronic device may provide, to the second electronic device (such as an authentication server), the identifier (operation 212) associated with the object. For example, the identifier may include a serial number.

Moreover, the electronic device may receive, from the second electronic device, a token (operation 214) associated with the identifier. Next, the electronic device may provide, to a third electronic device or a digital asset in the electronic device (such as a digital file), the token and security information (operation 216). Note that the token and the security information may be provided via a tunnel. In some embodiments, the security information may include or may specify a hash function or an encryption key.

Furthermore, the electronic device may provide, to the third electronic device or the digital asset in the electronic device, a vector of challenges (operation 218), where the vector of challenges includes N challenges and N is a non-zero integer. Note that the vector of challenges may be secured using the security information.

In some embodiments, the electronic device may optionally perform one or more additional operations (operation 220). For example, when the electronic device subsequently authenticates with the third electronic device or the digital asset, the electronic device may provide, to the third electronic device or the digital asset, a second vector of challenges, where the second vector of challenges includes M challenges, M is a non-zero integer, and a subset of the second vector of challenges matches a subset of the vector of challenges. (If the subset of the second vector of challenges and the subset of the vector of challenges do not match, then the authentication may not be successful.) Then, the electronic device may receive, from the third electronic device or the digital asset, a third vector of challenges. Next, the electronic device may select and store a second subset of the third vector of challenges for use in subsequent authentication of the third electronic device or the digital asset. Moreover, in some embodiments, before selecting and storing the second subset of the third vector of challenges, the electronic device may compute a fourth vector of challenges based at least in part on the third vector of challenges and the security information. Furthermore, in some embodiments, the third vector of challenges may be based at least in part on a biological identifier of an individual (such as a user).

Note that the digital asset or the third electronic device may perform counterpart operations to at least some of the aforementioned operations of the electronic device. For example, during operation, when the digital asset or the third electronic device receives the vector of challenges, the digital asset or the third electronic device may compute the second vector of challenges based at least in part on the second vector of challenges and the security information. Then, the digital asset or the third electronic device may select and store the subset of the vector challenges. Moreover, in some embodiments, the second vector of challenges may be computed based at least in part on the biological identifier of the individual.

Figure 3:
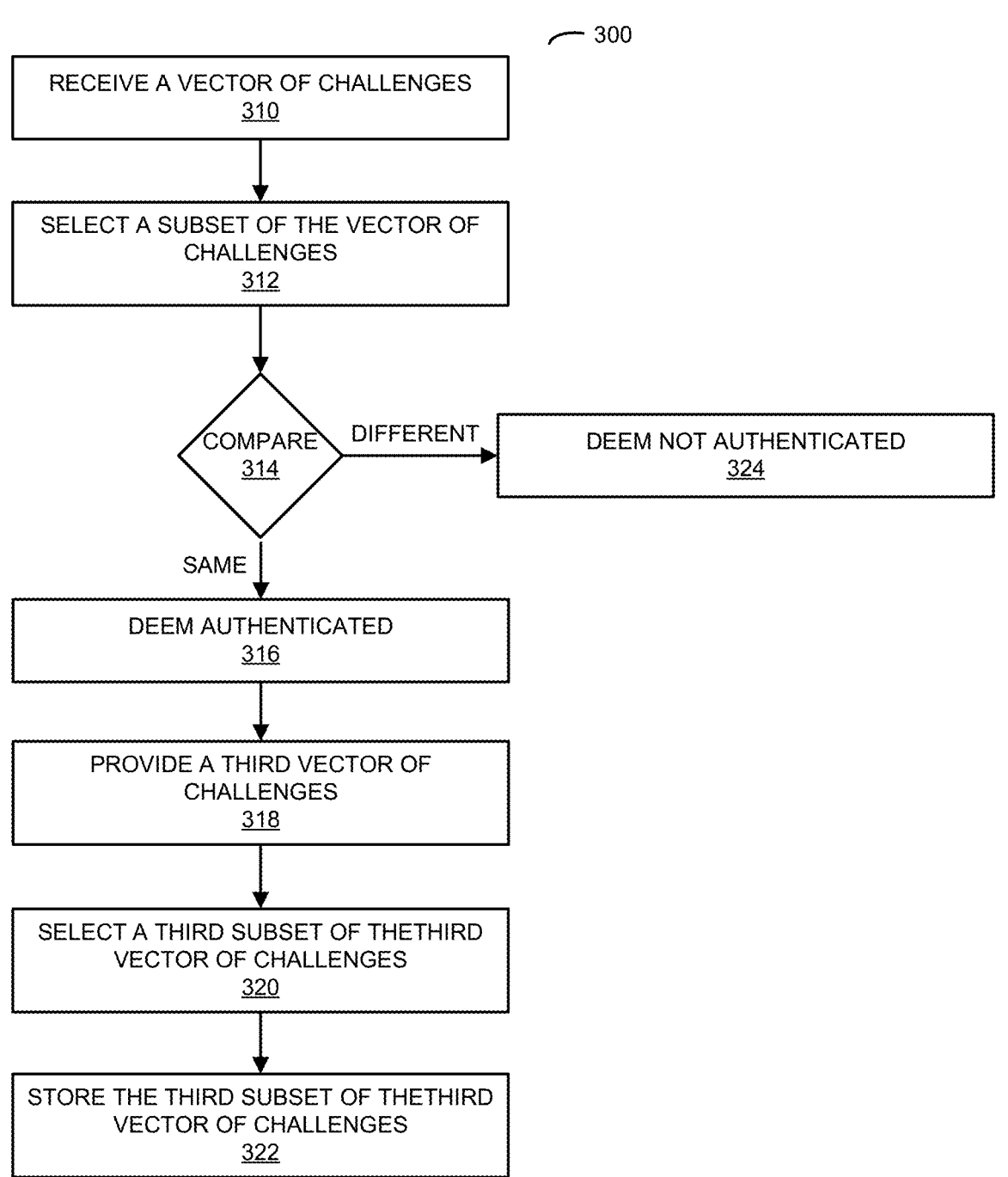
FIG. 3 is a flow diagram illustrating an example of a method for selectively performing authentication using a digital asset on an electronic device in FIG. 1 or the electronic device in FIG. 1 in accordance with an embodiment of the present disclosure.

FIG. 3 presents a flow diagram illustrating an example of a method 300 for selectively performing authentication, which may be performed by an electronic device (such as electronic device 110-1 or 110-2) or a digital asset on the electronic device (such as a digital file or a token). During operation, the digital asset in the electronic device may receive, from the electronic device, a vector of challenges (operation 310), wherein the vector of challenges includes N challenges and N is a non-zero integer. Then, the digital asset may select a subset of the vector of challenges (operation 312). Moreover, the digital asset may compare the subset of the vector of challenges with a stored second subset of a second vector of challenges (operation 314). When the subset of the vector challenges matches the stored second subset of the second vector of challenges (operation 314): the digital asset may deem the electronic device authenticated (operation 316): the digital asset may provide, to the electronic device, a third vector of challenges (operation 318), where the third vector of challenges includes M challenges and M is a non-zero integer: the electronic device may select a third subset of the third vector of challenges (operation 320): and the electronic device may store the third subset of the third vector of challenges (operation 322). Otherwise (operation 314), the digital asset may deem the electronic device to not be authenticated (operation 324).

Note that the vector of challenges and the third vector of challenges may be secured based at least in part on security information and/or a biological identifier of an individual. Note that the security information may include or specify a hash function or an encryption key. Moreover, the subset of the second vector of challenges may be secured based at least in part on security information and/or a biological identifier of an individual.

In some embodiments, the electronic device or the digital asset may optionally perform one or more additional operations. For example, prior to the receiving of the vector of challenges (operation 310), the digital asset may select and store the second subset of the second vector of challenges.

Moreover, the electronic device may use the stored third subset of the third vector of challenges during subsequent authentication of the digital asset. Note that authentication may be performed between the digital asset and the electronic device for each interaction between the digital asset and the electronic device.

In some embodiments of methods 200 (FIG. 2) and/or 300, there may be additional or fewer operations. Furthermore, the order of the operations may be changed, and/or two or more operations may be combined into a single operation.

Figure 4:
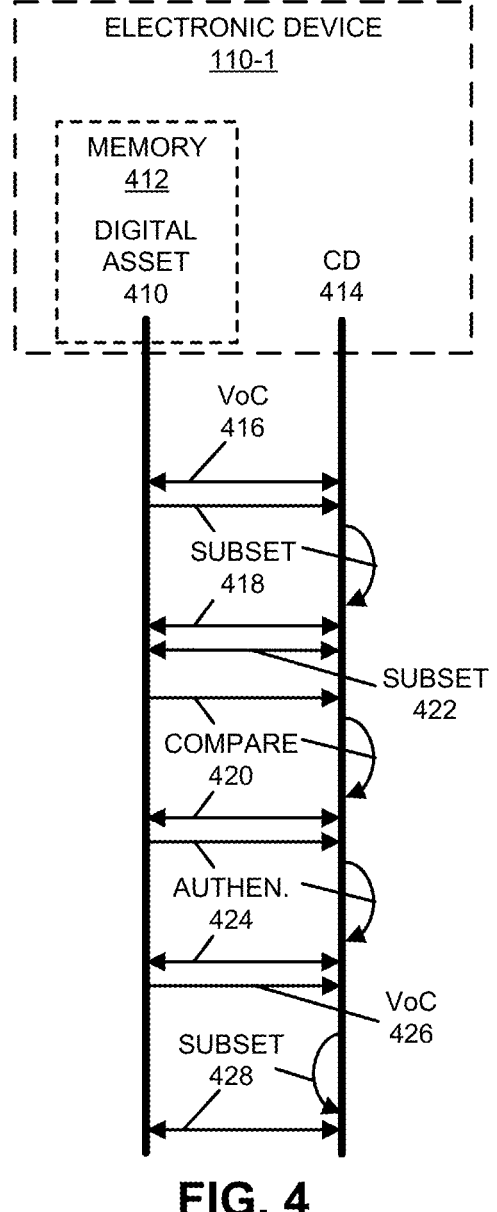
FIG. 4 is a drawing illustrating an example of communication among components in an electronic device in FIG. 1 in accordance with an embodiment of the present disclosure.

Embodiments of the authentication techniques are further illustrated in FIG. 4, which presents a drawing illustrating an example of communication among components in electronic device 110-1. In FIG. 4, a digital asset 410 in memory 412 in electronic device 110-1 may receive, from a computation device (CD) 414 in electronic device 110-1, a vector of challenges (VoC) 416, wherein the vector of challenges 416 includes N challenges and N is a non-zero integer. Then, digital asset 410 may (using computation device 414) select a subset 418 of the vector of challenges 416. Moreover, digital asset 410 may (using computation device 414) compare 420 subset 418 of the vector of challenges 416 with a stored subset 422 of a second vector of challenges in memory 412. When subset 418 of the vector challenges 416 matches the stored subset 422 of the second vector of challenges: digital asset 410 may (using computation device 414) deem electronic device 110-1 authenticated 424: digital asset 410 may (using computation device 414) provide, to computation device 414, a vector of challenges 426, where the vector of challenges 426 includes M challenges and M is a non-zero integer (e.g., the vector of challenges 426 may include subset 422 and a remainder of the vector of challenges 426 may include random or pseudo-random numbers): computation device 414 may select a subset 428 of the vector of challenges 426: and computation device 414 may store subset 428 of the vector of challenges 426 in memory 412 for use in subsequent authentication of digital asset 410.

While FIG. 4 illustrates communication between components using unidirectional or bidirectional communication with lines having single arrows or double arrows, in general the communication in a given operation in this figure may involve unidirectional or bidirectional communication.

We now further describe embodiments of the authentication techniques. 2FA, a type of MFA, is a security process that cross-verifies users with two different forms of identification. For example, the forms of identification may include: knowledge of an email address, and proof of ownership of a mobile phone.

Figure 5:
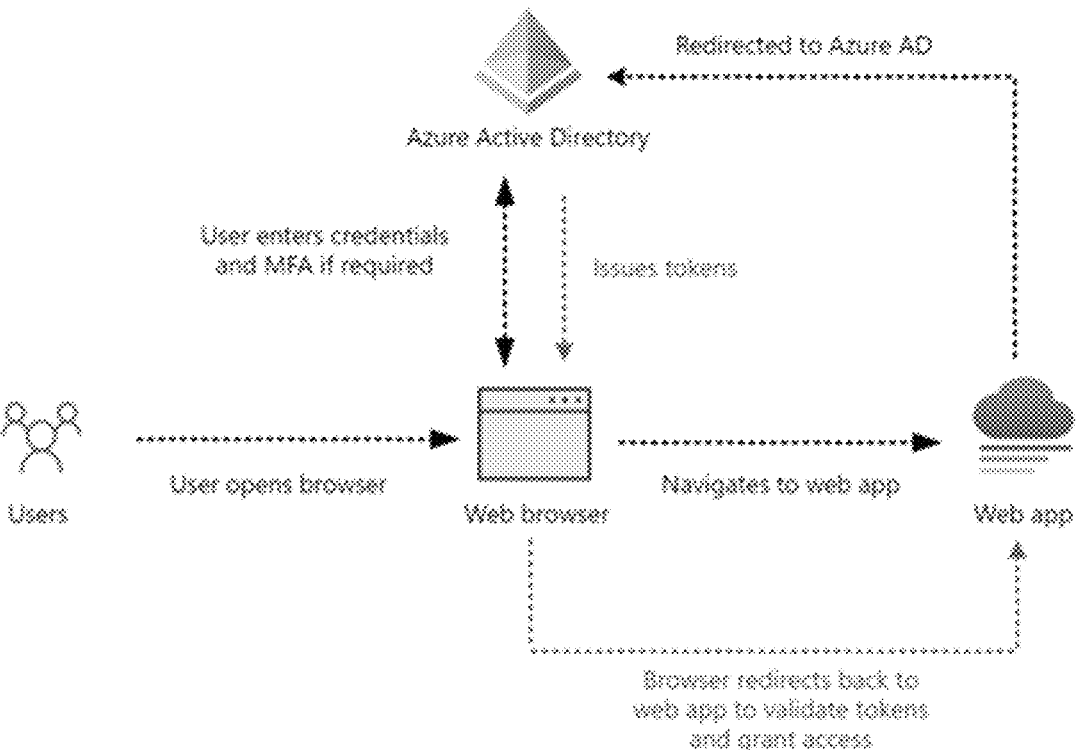
FIG. 5 is a drawing illustrating an example of an OAuth Token flow in accordance with an embodiment of the present disclosure.

Tokens are at the center of OAuth 2.0 (from the Internet Engineering Task Force of Wilmington, Delaware) identity platforms, such as Azure Active Directory or Azure AD (from Microsoft Corp. of Redmond, Washington). In order to access a resource (e.g., a Web application protected by Azure AD), a user must present a valid token. Moreover, in order to obtain that token, the user must sign into Azure AD using their credentials. At that point, depending on the policy, they may be required to complete MFA. Then, the user may present the token to the Web application, which validates the token and allows the user access. FIG. 5 presents a drawing illustrating an example of an OAuth Token flow.

Note that when Azure AD issues a token, it usually contains information such as the username, source Internet Protocol (IP) address, MFA, and more. It also typically includes any privileges a user has in Azure AD. If you sign in as a Global Administrator to your Azure AD tenant, then the token may reflect that. Two of the most common token theft techniques have been through adversary-in-the-middle (AitM) frameworks or the use of commodity malware (which enables a 'pass-the-cookie' scenario).

Figure 6:
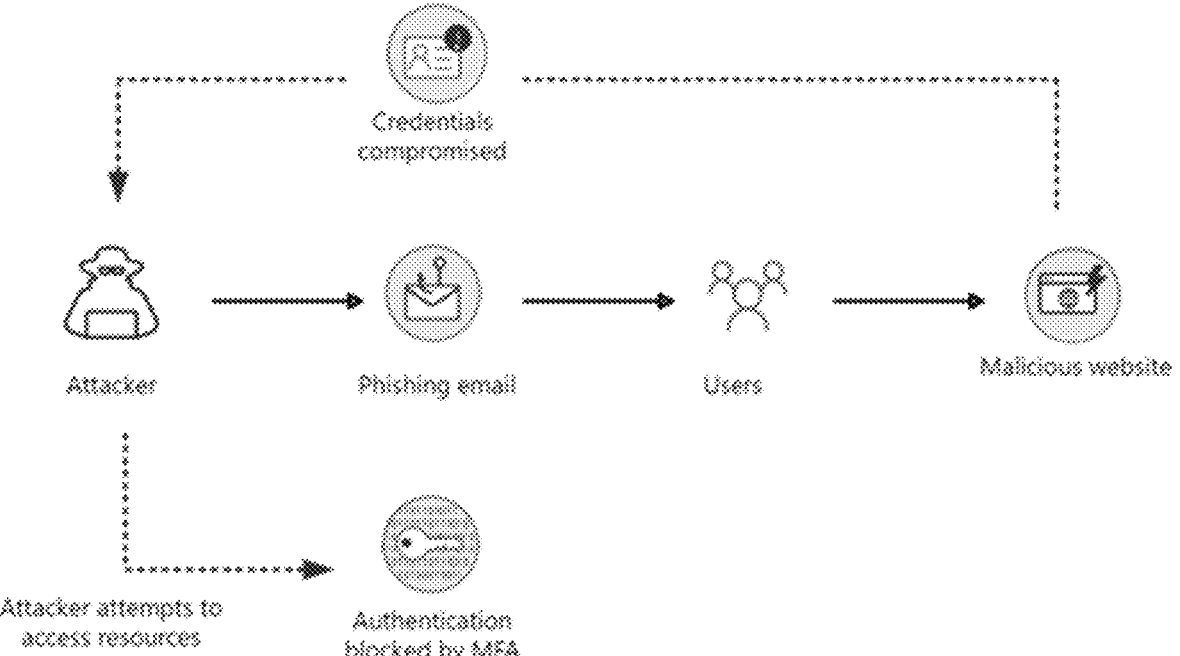
FIG. 6 is a drawing illustrating an example of the use of multi-factor authentication (MFA) to mitigate a common credential phishing attack in accordance with an embodiment of the present disclosure.

With traditional credential phishing, the attacker may use the credentials they have compromised to try and sign in to, e.g., Azure AD. If the security policy requires MFA, the attacker may be halted from being able to sign in successfully. While the users' credentials were compromised in this attack example, the threat actor may be prevented from accessing organizational resources. FIG. 6 presents a drawing illustrating an example of the use of MFA to mitigate a common credential phishing attack.

Figure 7:
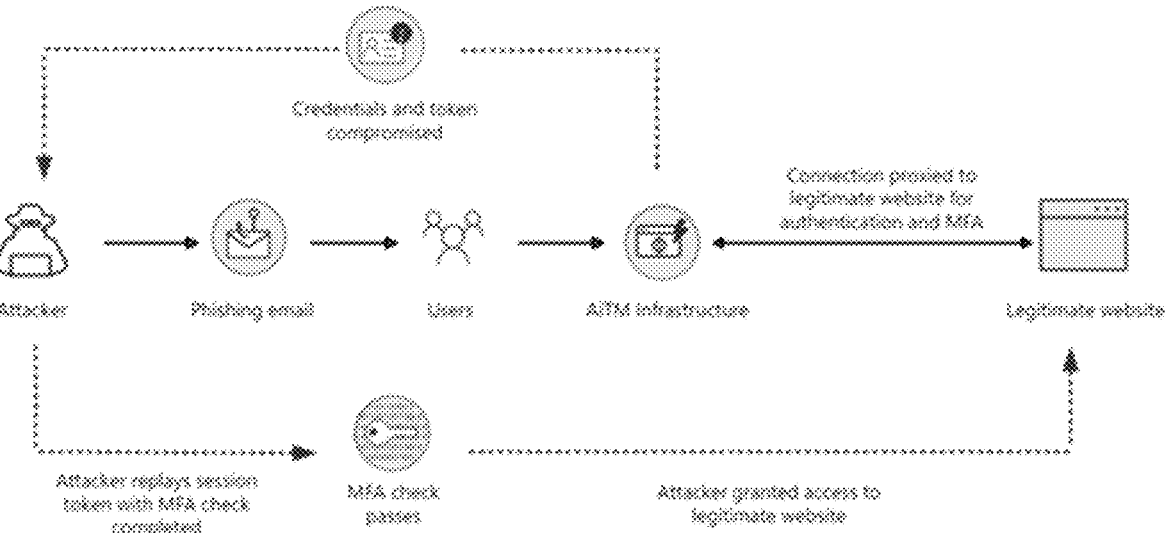
FIG. 7 is a drawing illustrating an example of an Adversary-in-the Middle (AitM) attack in accordance with an embodiment of the present disclosure.

However, attacker methodologies are always evolving. Towards this end, more attackers are using AitM phishing attacks to steal tokens instead of passwords. For example, frameworks such as Evilginx2 go far beyond credential phishing by inserting malicious infrastructure between the user and the legitimate application the user is trying to access. When the user is phished, the malicious infrastructure captures both the user's credentials and the token. FIG. 7 presents a drawing illustrating an example of an AitM attack.

If a regular user is phished and their token stolen, the attacker may attempt business email compromise (BEC) for financial gain. Moreover, if a token with Global Administrator privilege is stolen, the attackers may attempt to take over, e.g., the Azure AD tenant entirely, resulting in loss of administrative control and total tenant compromise.

A 'pass-the-cookie' attack is a type of attack in which an attacker may bypass authentication controls by compromising browser cookies. At a high level, browser cookies allow Web applications to store user authentication information. This allows a website to keep a user signed in and not constantly prompt for credentials whenever the user clicks on a new Web page.

'Pass-the-cookie' is like pass-the-hash or pass-the-ticket attacks in, e.g., Active Directory. Notably, after authentication to Azure AD via a Web browser, a cookie is created and stored for that session. When an attacker can compromise an electronic device and extract the Web browser cookies, they may pass the cookie into a separate Web browser on another system, bypassing security checkpoints along the way. Users who are accessing corporate resources on personal electronic devices are especially at risk.

Figure 8:
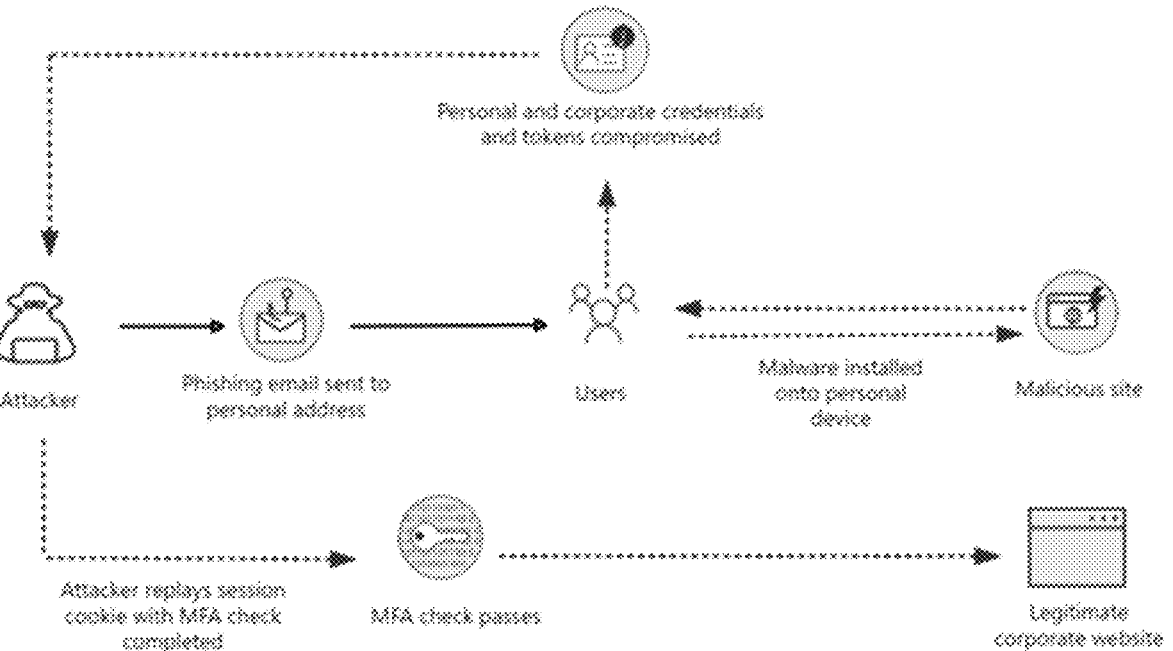
FIG. 8 is a drawing illustrating an example of a Pass-the-Cookie attack in accordance with an embodiment of the present disclosure.

Personal electronic devices often have weaker security controls than corporate-managed electronic devices, and information technology staff often do not have visibility to these electronic devices to determine compromise. They also have additional attack vectors, such as personal email addresses or social media accounts users may access on the same electronic device. Attackers can compromise these systems and steal the authentication cookies associated with both personal accounts and the users' corporate credentials. FIG. 8 presents a drawing illustrating an example of a Pass-the-Cookie attack.

Commodity credential theft malware like Emotet, Redline, IcedID, etc. all have built-in functionality to extract and exfiltrate Web browser cookies.

Additionally, the attacker does not have to know the compromised account password or the email address for this to work. These details are typically held within the cookie.

Thus, there is a clear need to provide a MFA technology, system to solve numerous attack surfaces, including those described previously.

Figure 9:
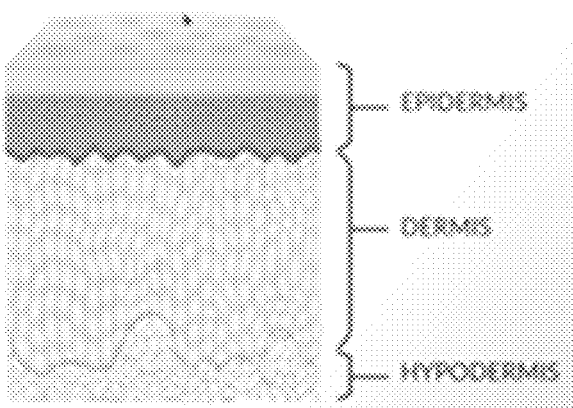
FIG. 9 is a drawing illustrating an example of a cross-section of skin in accordance with an embodiment of the present disclosure.

In the disclosed authentication techniques, at a high level, a system may establish 3-layer communication between a token, a mobile application, a cloud server (or computer), and a third party server (or computer). The mobile application may be a passthrough connection and may be the outer skin layer (by way of analogy, the epidermis). In this analogy, the dermis layer may be a tunnel between the server and the token. The third party server may connect with the token directly using, in this analogy, the hypodermis. FIG. 9 presents a drawing illustrating an example of a cross-section of skin.

In most use cases, a third party server may provide a service that requires authentication.

The system's main actors may include:

The individual who wears or holds a token.

The token, which may be hardware or software.

The mobile-based application or the smart communication device (the Client Service).

The cloud-based server.

The vendor application, such as a web browser-based, mobile application-based, or any other application that communicates with the third party server.

The third party server.

The system may establish continuous authenticity with the token using the dermis tunnel and may allow the third party server to independently verify or authenticate the use of the third party Application, including per transaction signature.

The systems may embed at least the same requirements as are used for curveZMQ. Internal to the token system, any communications between servers are restricted to known clients and servers. The crypto-database-server may be responsible to acknowledge known/authorized clients based on their public keys only. The database may be in memory and includes all possible client socket public keys.

A token may be considered part of the system and may be a known client. Therefore, V-token may use a known public key that is identifiable using the token hardware identity. Each Token client may have its own key, which the server checks. In this case, the server may grant access to clients according to their authenticated identity. An attacker may steal the client's public key, but cannot do anything with this unless it can also steal the client's secret key. In order to avoid this level of attack and to provide deterrence, every token may include a list of key pairs that can be referred to via an index. The token and the server may never need to share public keys when establishing trust. Instead, only later do they use session ephemeral keys to send and receive session messages.

The disclosed token system may be designed to withstand an arbitrary man-in-the-middle attack, including the replacement of the system servers via an internal root attack or by design. The end to end between the token and third party servers may be guaranteed to be fully secured. Moreover, the shared secrete between the token and a third party application server may be known only to the third party application server and may be generated dynamically or on the fly and only once upon request by the token, such that it is guaranteed to be correct if-and-only if the token is the correct token physically attached to the correct user.

Figure 10:
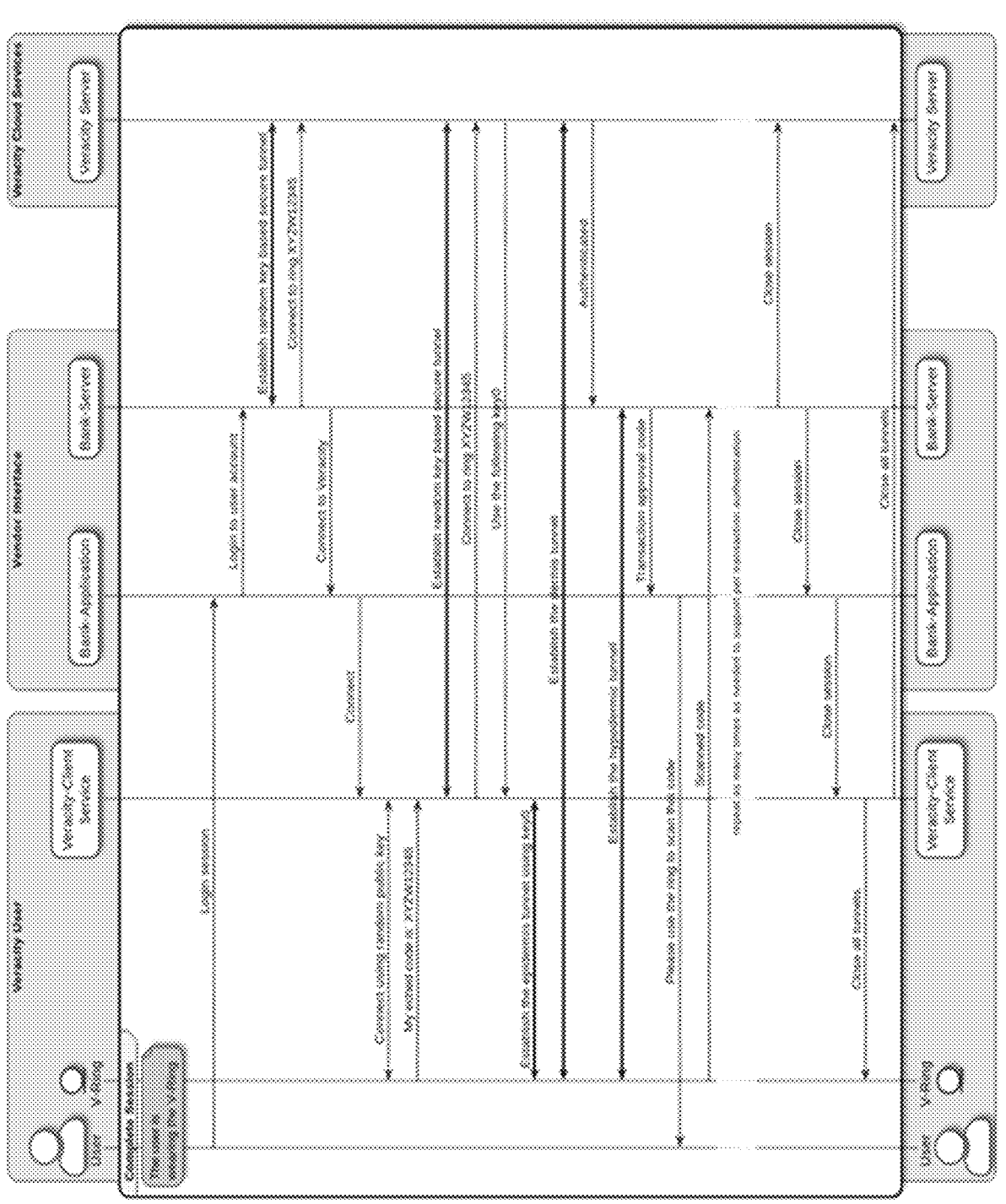
FIG. 10 is a drawing illustrating an example of an authentication technique in accordance with an embodiment of the present disclosure.

FIG. 10 presents a drawing illustrating an example of an authentication technique.

Although we are using a tunnel between the mobile application and the token, we can keep this communication channel open. Some implementations may do exactly this.

We now discuss establishing an application-to-token secure tunnel or A2T (which is sometimes referred to as 'the epidermis tunnel'). The token's security may present a challenge that exists today in mobile telephones. Applications may use secure keys by reference. We may use the same type of technology in our encryption engine as follows: every token may have an N+1 number of slots from 0 to N (where N is a non-zero integer).

When the mobile application is connected to the token, both sides may use a random public key for communication, which they exchange in the open. Once this initial connection is established, the mobile client may connect to the server using the token's identity and may retrieve this token's public key stored in slot 0 and may notify the token that it is moving into a secure communication based on slot 0. The mobile client may also share a public key that the server gives it specifically for the token's later use. The token cannot access its slotted keys directly, but must use the encryption engine to do so. The token may ask the encryption engine to use slot 0 in combination with the mobile public key to establish Diffie-Hellman (DH) encryption. The token may send a challenge to the mobile application and they may establish a new secure tunnel between the two. This tunnel is sometimes referred to as the Application-to-Token secure tunnel (A2T) or 'the epidermis.'

The reason to use a known key at slot 0 to establish mobile connectivity with the server may be to allow the server to reject any non-token application connection request at the lowest communication level and to open a connection with the server application layer, thereby reducing the load during denial of service attack.

We now describe establishing Server-to-Token secure tunnel (S2T) or 'the dermis tunnel.' Once a secure tunnel A2T is established, the token may use the server's public key to notify the server of its existence and availability. The server in turn may send a reply message to the token. This may be the first message. It may be encrypted using DH with the tokens key in slot 1 and the server public key. The server may respond with a message that changes the key slot for the client to a random slot, and may provide a new public key for the server.

The token may acknowledge the message and establish DH with the server using its new server public key in the random slot that was chosen by the server. The server and the token may establish the dermis tunnel using the server random key and the token public hidden key in the random slot chosen by the server and communicated to the token with the hello message.

Once this dermis tunnel is established (S2T), the token may provide the server its shared secret (which may be based on the user's biometrics), as it is being perceived and monitored by the token. Moreover, the server may periodically ask for the shared secret in order to maintain continued biometric authenticity using the dermis tunnel.

We now describe establishing third party-to-token secure tunnel (TP2T) or 'the hypodermic tunnel.' A third party that wishes to communicate with the token may be able to do so via the server, e.g. it will be able to create the hypodermic tunnel (TP2T) managed by the server. The third party may establish the hypodermic tunnel using a random public key provided by the token and its own random public key using DH.

The third party server may trust that the cloud server is continuously authenticating the token using biometrics over the dermis tunnel.

In some embodiments, the third party server may use the hypodermis tunnel to share a secret with the token and may use the token to authenticate transactions within a session.

The shared secret between the third party and the token may exist as long as the session exists.

We now describe the use of the hypodermic tunnel to authenticate a session. When a third party is using an application that is running on a Web browser, it may associate the token/user with the Web browser session by sending a unique code (such as a GSI code) to the Web browser application and asking the user to scan the code using the token. The token may send the GSI code over the hypodermis tunnel back to the third party server. This may create an authenticated Web browser session. For higher security, this GSI scanning by the token and back to the server may be used to sign a transaction while in session.

This approach may work for mobile applications as well (and, thus, not only for Web applications). The token may be used to sign anything and any type of transaction.

Note that the GSI code is only an example. The token may support multiple formats, including steganography.

We now describe an example of third party use of the hypodermic tunnel. When the user is logged into a bank account using the Web browser, the bank may need to connect the token to the user via the Web browser interface. The bank may display on the Web browser a unique barcode and ask the user to scan it with the token. The user may scan the barcode, and the token may send this code via the token interface through the inner tunnel to the back server. Using a code to associate the Web browser application with a user may allow users to sign every transaction with their token.

The bank may have no access to the biological authenticity tunnel except through the cloud server. The bank may need to connect the Web browser application to the token with this approach. The bank may force the user to sign every transaction with their token.

Note that this signing process may apply to many applications and use-cases.

We now describe trust between the token and the server. The V-Ring or wearable device may be designed to operate or communicate only with a trusted server. In order to secure trust, the token may have some information that only the server knows. The token may assumes that if the server knows this information, it is a valid server and a trusted one at that.

There are many ways to generate trust. The token may use a public key vector generated during manufacturing or setup time. In the present discussion, we assume that both alternatives (manufacturing time and set up time) are available for the system design team. As a result, the token may have a vector addressable by an integer number between 0 to N of (public, secure) key pairs in nonvolatile memory. At the same time, a trusted server may have access to the vector including the public keys only. The server and the token may challenge each other using any of the entries and expect to be able to communicate successfully with each other. The fact that the server has a static public key makes no difference in this case and may reduce the number of messages needed between the token and the server when they establish trust.

Note that a token may refuse communications with a non-trusted server. Notably, the Token client may refuse a connection request from an untrusted source. It may allow a mobile client to connect with the token in order to establish a path to a server. It may also use the mobile server to communicate with the user. All these communications may never establish trust, and may not require any trust.

The token may allow communication with a mobile client without establishing a biological (or biological identifier or metric) scan or requiring any other special security.

The token may not allow communications with the server without a client establishing a biological scan or other credentials that can be determined in the future.

The token may periodically (such as after a time interval) verify the server and the server may verify the token periodically.

During manufacturing, the token may be in a setup state. In this state, it may communicate with a server to establish a set of constant keys that may be used for verification when the token moves from a manufacturing to production state.

Note that the token may support at least two states of operation: setup, and production. The setup state may only be valid during the manufacturing process. The token may enter the production state when the setup of keys and other permanent information ends.

Figure 11:
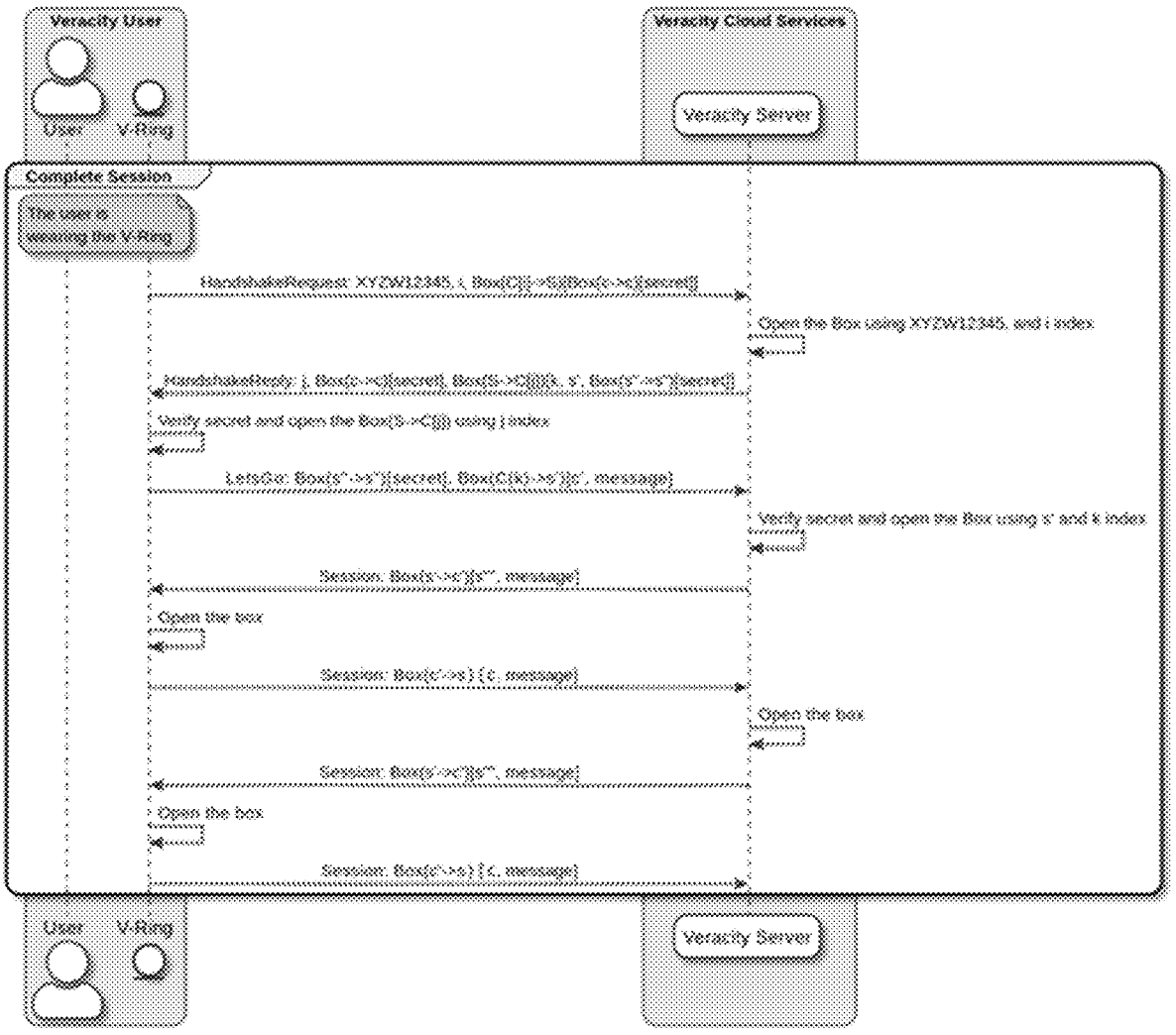
FIG. 11 is a drawing illustrating an example of an authentication technique in accordance with an embodiment of the present disclosure.

FIG. 11 presents a drawing illustrating an example of an authentication technique.

As discussed previously, a token may establish complete bidirectional trust with the cloud server. Only after that trust is established may the server and the token be able to communicate with each other.

One can think about a use case that requires trust between Tokens. This trust may assume the token owners know each other or establish trust with each other. The token may use its non-volatile memory to store public keys shared with another token, such that each token may encrypt and sign messages to the other, knowing that no one else can read these messages, or verify the signature or the association between tokens/entities.

In order to establish token-to-token trust, every token may have a second vector of public, secure key pairs. The server may choose a random entry for both tokens that wish to connect and share this random entry. Every token may have a table that includes information about the other token, such as token identity, encryption table index, and a public key associated with this index, and may use the public key to encrypt messages to the other token and establish trust.

Tokens that trust each other may use the trusted public key to send the first message. All other messages may use randomly generated key sets.

The server may keep a data structure or database of such established connections and may be able to refresh those when a token is being legally replaced by its owner.

We now describe a security architecture analysis. The A2T protocol may assume the token is unknown and that the application is not trusted. Moreover, the token may not be trusted, and the mobile application may not be trusted. Based on these two assumptions, the protocol between the mobile application and the token may be open. This analysis may demonstrate that the mobile application may be public, and there may not be an issue if its code is compromised. We do not trust mobile devices to maintain security. Thus, it may be safe to assume that the application is compromised.

The S2T connection may be fully encrypted and may use encryption slots known to the token and the server only. Thus, a compromised A2T tunnel may not have a token over the S2T tunnel.

The principle by which the token refuses a connection from an untrusted source, and the fact that any communication may be based on trust and may be verified periodically during the conversations between the token client and any cloud server it is connected to, may force an attack to focus on the server system and thus may be shifted away from the token client.

The only trust in the system may be in the S2T interface. Based on this trust, we can have a trusted token-to-token (T2T) interface and token-to-third party (TP2T) interfaces. These trusts may safeguard the scramble that the token is providing for a given random vector. This scramble may be based on the biological scan code and a nonce. In this case, both the nonce and the scrambled results may be sent encrypted to a trusted third party. The third party may keep the scrambled results encrypted (different encryption from the one used for the communications) on the third-party server.

The system may be used to solve AitM attacks. Notably, in the Aitm attack described previously, there is an AitM infrastructure that is positioned between the user, the user client and the server the user wishes to interact with. This AitM infrastructure may record and may be able to repeat authentication information. The AitM may assume that, once granted, the authentication and entry to the system will not be challenged. This may allow the AitM infrastructure to operate as the user in the system for a period of time in which the user authentication is established.

Using the disclosed authentication techniques, a transaction that the user is doing may be verified by the server at two levels. Notably, the S2T interface may maintain continuous connectivity with the authenticated user. If the user is not in physical contact with the token, this interface may be broken immediately and discontinued, which may revoke the ability of the TP2T tunnel to work.

The TP2T is a tunnel that maintains transactional verification with the token, e.g., every time there is a transaction that the user is acting on or requesting from the server via his/her client. The third party server may send a code to the user to be verified by the user token. The user may have to sign the verification code with his/her token to allow this transaction. The token may use the camera to image the code and send it back signed via the TP2T tunnel. The server may only act if-and-only-if it gets the correct verifiable signature.

In case of the user disconnecting from the system, the MitAM infrastructure may still be connected and trying to imitate/fake the user authentication and initiate activities on the server. The server may try to verify these actions with the user but will fail since the user is no longer connected to the client and cannot receive codes to verify.

In the Pass-the-cookie attack described previously, there is an AitM infrastructure that is able to replicate MFA cookies saved on a Web browser or another application.

As in the Adversary-in-the-middle (AitM) attack, in the disclosed authentication techniques, a transaction that the user is doing may be verified by the server at two levels. Notably, the S2T interface may maintain continuous connectivity with the authenticated user. If the user is not in physical contact with the token, this interface may be broken immediately and discontinued, which may revoke the ability of the TP2T tunnel to work.

The TP2T is a tunnel that maintains transactional verification with the token, e.g., every time there is a transaction that the user is acting on or requesting from the server via his/her client. The third party server may send a code to the user to be verified by the user token. The user may have to sign the verification code with his/her token to allow this transaction. The token may use the camera to image the code and send it back signed via the TP2T tunnel. The server may only act if-and-only-if it gets the correct verifiable signature.

Therefore, the fact that the application client has a valid cookie is not sufficient. The MitAM infrastructure may still be connected and trying to imitate/fake the user authentication and initiate activities on the server. The server may try to verify these actions with the user, but will fail because the user is no longer connected to the client and cannot receive codes to verify.

In the disclosed authentication techniques, authentication may be continuous and may be used to authenticate transactions. Moreover, in the disclosed authentication techniques, multiple independent tunnels may be established. Note that a camera or image sensor may be used for physical presence signing of transactions. Moreover, physical presence may be detected in the disclosed authentication techniques without the use of a camera by using near-field communication and biological-based authentication to maintain the connected tunnels.

Figure 12:
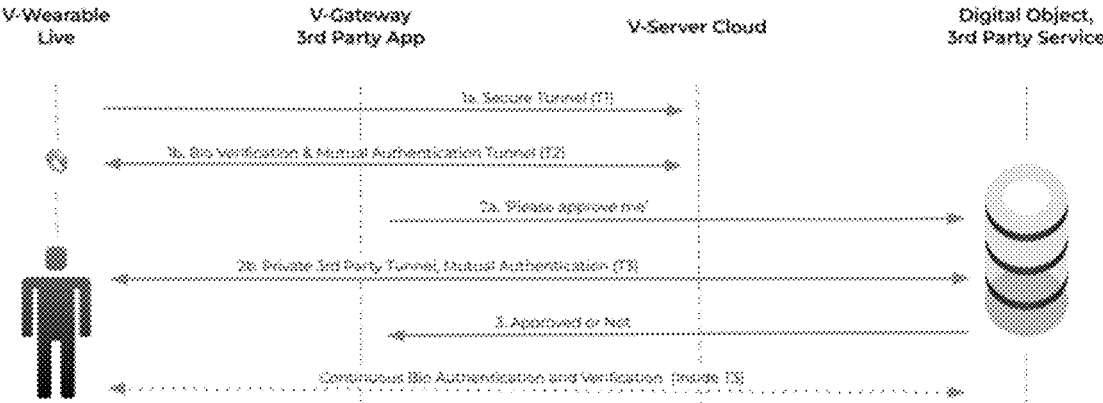
FIG. 12 is a drawing illustrating an example of an authentication technique in accordance with an embodiment of the present disclosure.
Figure 13:
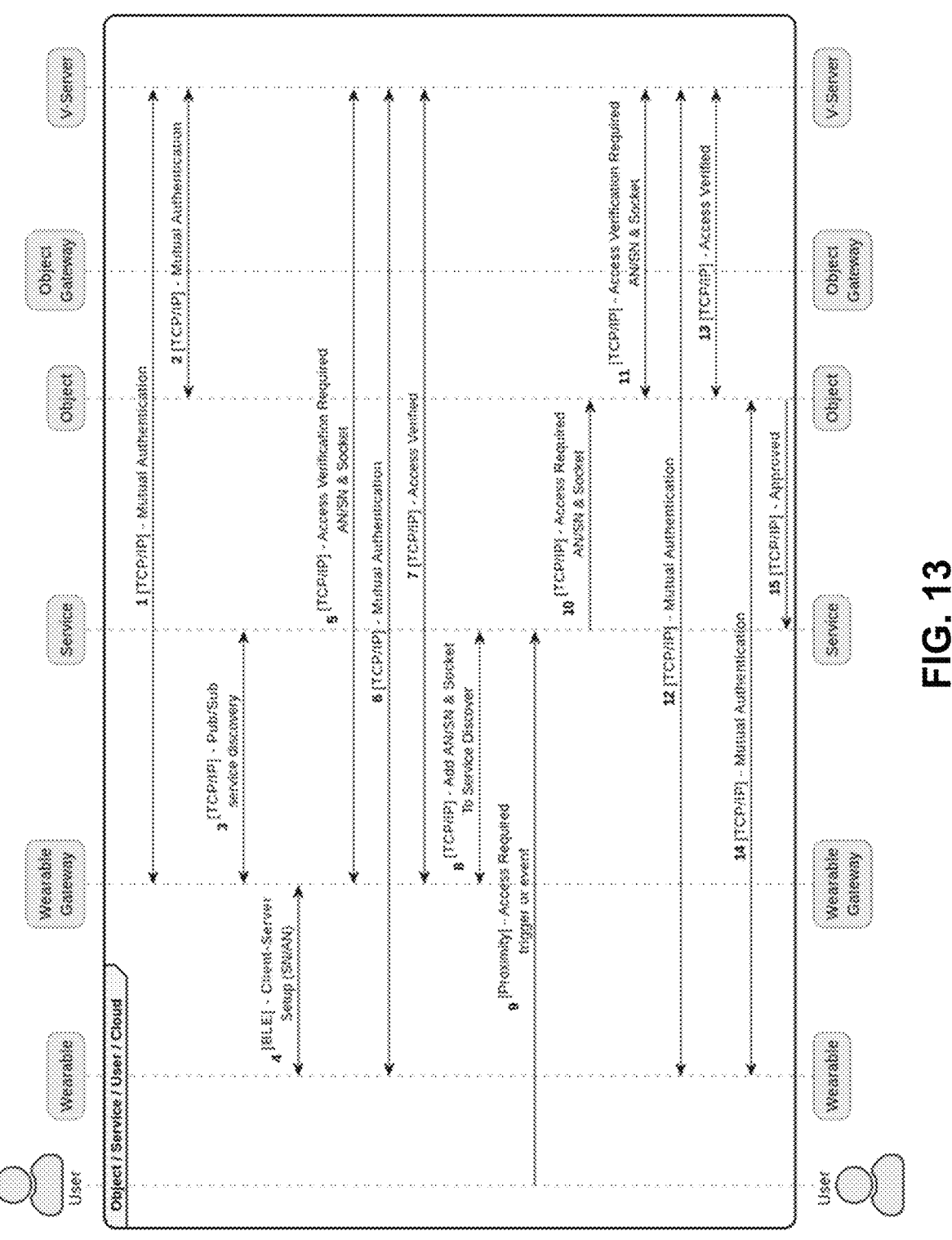
FIG. 13 is a drawing illustrating an example of an authentication technique in accordance with an embodiment of the present disclosure.
Figure 14:
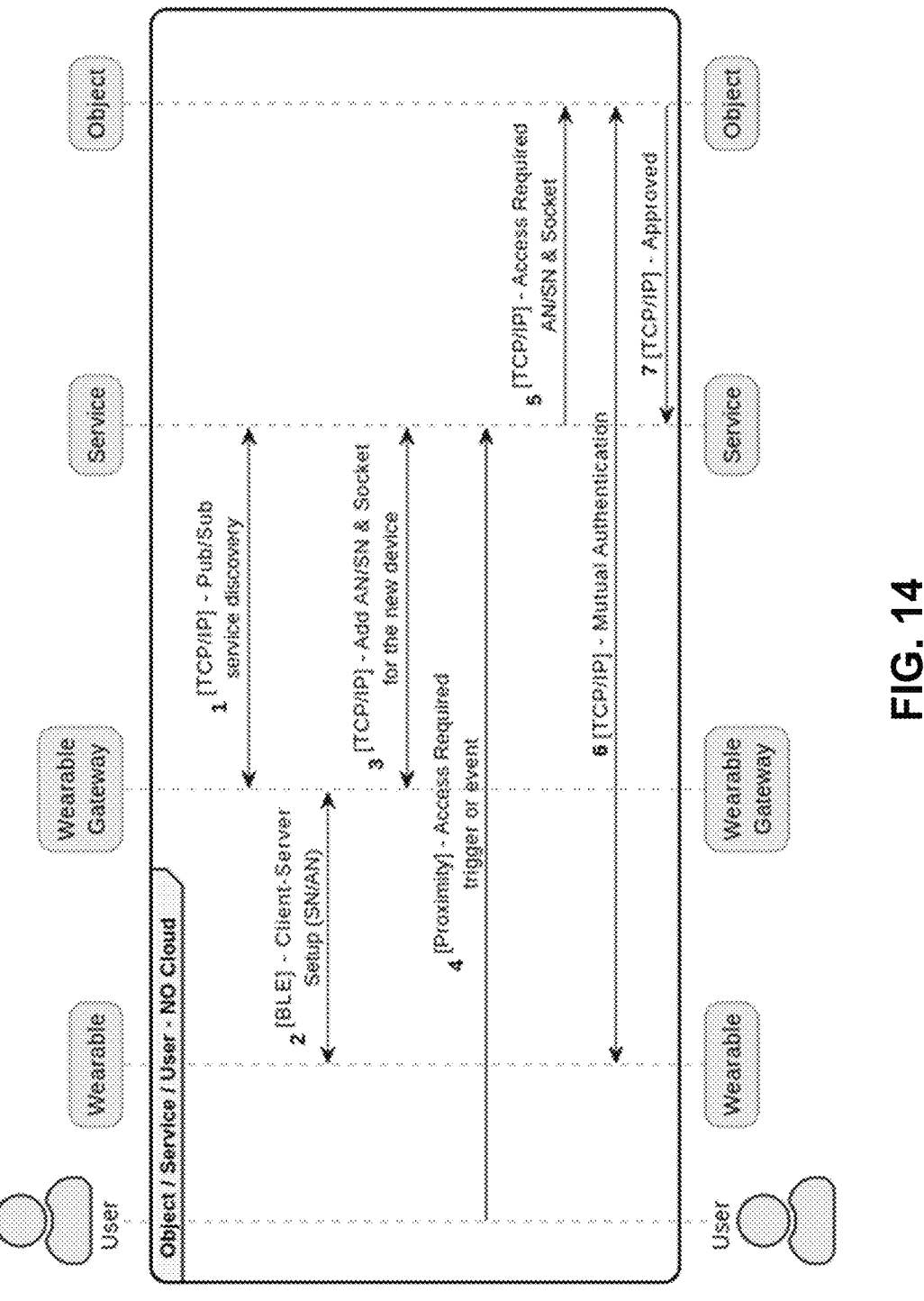
FIG. 14 is a drawing illustrating an example of an authentication technique in accordance with an embodiment of the present disclosure.

FIGS. 12-14 present drawings illustrating examples of an authentication technique.

In some embodiments, the authentication techniques may use artificial intelligence (e.g., a pretrained neural network) and/or machine learning (such as a pretrained classifier based at least in part on a supervised or an unsupervised machine-learning technique).

Moreover, the authentication techniques may provide authentication/verification for one or more types of transactions, including: during communication (e.g., texting, phone calls, etc.); a financial transaction (such as banking or a credit-card transaction, e.g., authentication/verification of an online credit or debit-card transaction); a medical-related transaction; and/or another type of transaction (e.g., any packet or packet-based transaction). Note that the authentication techniques may enable electronic signatures on any and/or all transaction, which may be signed in context by the user without their direct involvement.

Furthermore, transactions may be authenticated per session or per element/event in a session. For example, when a user walks away from an electronic device that is controlling or is involved in a session (such as computer terminal), the session may be automatically ended by the system in order to maintain authentication. Thus, the system may maintain authentication throughout a session and may have the ability to control a session in order to maintain this uninterrupted authentication.

Additionally, the authentication techniques may provide identity solutions without maintaining or storing any private information of or associated with an individual. The system may authenticate a person in real time and continuously without maintaining a memory of the events that trigger the learning process anywhere in the electronic device(s) and/or in the cloud.

In the present discussion, we use the following definitions.

A 'transaction' (Tr) may include the act of communicating information associated with a transaction, and can be and is not limited to a telephone call, a text message, a financial transaction, etc. It is a type of interaction between two different electronic devices or two objects.

Moreover, a 'neural network' may include a recurrent (RNN), a convolutional network (CNN), a deep convolutional network (DNC), or another type of neural network, and may not be limited to one kind. In the authentication techniques, the NN may represent the NN can be any other type of mathematical technique (such as a supervised-learning technique, a hash function, an encoding function, etc.) that delivers the same code using a linear or a nonlinear process. A NN represents a statistical model that delivers a code or a set of numerical or alphanumerical values that represents the input.

Furthermore, a token may include an object (in software or in hardware) that represents the right to perform some operation. A token may include: a session token (such as a unique identifier of an interaction session) a security token or hardware token, or an authentication token or crypto-graphic token (such as a physical device for computer authentication).

We now describe embodiments of an electronic device, which may perform at least some of the operations in the authentication techniques. FIG. 15 presents a block diagram illustrating an example of an electronic device 1500. For example, electronic device may include: one of electronic devices 110, computer 112, access point 116-1, or radio node 118. This electronic device may include processing subsystem 1510, memory subsystem 1512, and networking subsystem 1514. Processing subsystem 1510 includes one or more devices configured to perform computational operations. For example, processing subsystem 1510 can include one or more microprocessors, ASICs, microcontrollers, programmable-logic devices, GPUs and/or one or more digital signal processors (DSPs). Note that a given component in processing subsystem 1510 is sometimes referred to as a 'computational device.'

Memory subsystem 1512 includes one or more devices for storing data and/or instructions for processing subsystem 1510 and networking subsystem 1514. For example, memory subsystem 1512 can include dynamic random access memory (DRAM), static random access memory (SRAM), and/or other types of memory. In some embodiments, instructions for processing subsystem 1510 in memory subsystem 1512 include: program instructions or sets of instructions (such as program instructions 1522 or operating system 1524), which may be executed by processing subsystem 1510. Note that the one or more computer programs or program instructions may constitute a computer-program mechanism. Moreover, instructions in the various program instructions in memory subsystem 1512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1510.

In addition, memory subsystem 1512 can include mechanisms for controlling access to the memory. In some embodiments, memory subsystem 1512 includes a memory hierarchy that includes one or more caches coupled to a memory in electronic device 1500. In some of these embodiments, one or more of the caches is located in processing subsystem 1510.

In some embodiments, memory subsystem 1512 is coupled to one or more high-capacity mass-storage devices (not shown). For example, memory subsystem 1512 can be coupled to a magnetic or optical drive, a solid-state drive, or another type of mass-storage device. In these embodiments, memory subsystem 1512 can be used by electronic device 1500 as fast-access storage for often-used data, while the mass-storage device is used to store less frequently used data.

Networking subsystem 1514 includes one or more devices configured to couple to and communicate on a wired and/or wireless network (i.e., to perform network operations), including: control logic 1516, an interface circuit 1518 and one or more antennas 1520 (or antenna elements). While FIG. 15 includes one or more antennas 1520, in some embodiments electronic device 1500 includes one or more nodes, such as antenna nodes 1508, e.g., a metal pad or a connector, which can be coupled to the one or more antennas 1520, or nodes 1506, which can be coupled to a wired or optical connection or link. Thus, electronic device 1500 may or may not include the one or more antennas 1520. Note that the one or more nodes 1506 and/or antenna nodes 1508 may constitute input(s) to and/or output(s) from electronic device

1500. For example, networking subsystem 1514 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 1514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1500 may use the mechanisms in networking subsystem 1514 for performing simple wireless communication between the electronic devices, e.g., transmitting advertising or beacon frames and/or scanning for advertising frames transmitted by other electronic devices as described previously.

Within electronic device 1500, processing subsystem 1510, memory subsystem 1512, and networking subsystem 1514 are coupled together using bus 1528. Bus 1528 may include an electrical, optical, and/or electro-optical connection that the subsystems can use to communicate commands and data among one another. Although only one bus 1528 is shown for clarity, different embodiments can include a different number or configuration of electrical, optical, and/or electro-optical connections among the subsystems.

In some embodiments, electronic device 1500 includes a display subsystem 1526 for displaying information on a display, which may include a display driver and the display, such as a liquid-crystal display, a multi-touch touchscreen, etc.

Moreover, electronic device 1500 may include a user-interface subsystem 1530, such as: a mouse, a keyboard, a trackpad, a stylus, a voice-recognition interface, and/or another human-machine interface. In some embodiments, user-interface subsystem 1530 may include or may interact with a touch-sensitive display in display subsystem 1526.

Electronic device 1500 can be (or can be included in) any electronic device with at least one network interface. For example, electronic device 1500 can be (or can be included in): a desktop computer, a laptop computer, a subnotebook/netbook, a server, a tablet computer, a smartphone, a cellular telephone, a smartwatch, a smart pen, a consumer-electronic device, a portable computing device, a wearable electronic device, an access point, a transceiver, a radio node, a router, a switch, communication equipment, a controller, test equipment, and/or another electronic device.

Although specific components are used to describe electronic device 1500, in alternative embodiments, different components and/or subsystems may be present in electronic device 1500. For example, electronic device 1500 may include one or more additional processing subsystems, memory subsystems, networking subsystems, and/or display subsystems. Additionally, one or more of the subsystems may not be present in electronic device 1500. Moreover, in some embodiments, electronic device 1500 may include one or more additional subsystems that are not shown in FIG. 15. Also, although separate subsystems are shown in FIG. 15, in some embodiments some or all of a given subsystem or component can be integrated into one or more of the other subsystems or component(s) in electronic device 1500. For example, in some embodiments program instructions 1522 are included in operating system 1524 and/or control logic 1516 is included in interface circuit 1518.

Moreover, the circuits and components in electronic device 1500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1514 and/or electronic device 1500. The integrated circuit may include hardware and/or software mechanisms that are used for transmitting wireless signals from electronic device 1500 and receiving signals at electronic device 1500 from other electronic devices. Aside from the mechanisms herein described, radios are generally known in the art and hence are not described in detail. In general, networking subsystem 1514 and/or the integrated circuit can include any number of radios. Note that the radios in multiple-radio embodiments function in a similar way to the described single-radio embodiments.

In some embodiments, networking subsystem 1514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein includes receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet, a cellular-telephone communication protocol (such as LTE) and/or a Wi-Fi communication protocol as an illustrative example, in other embodiments a wide variety of communication protocols and, more generally, wireless communication techniques may be used. For example, the communication protocol in a WLAN may use OFDMA. Thus, the authentication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the authentication techniques may be implemented using program instructions 1522, operating system 1524 (such as a driver for interface circuit 1518) or in firmware in interface circuit 1518. Thus, the authentication techniques may be implemented at run-time of program instructions 1522. Alternatively or additionally, at least some of the operations in the authentication techniques may be implemented in a physical layer, such as hardware in interface circuit 1518.

In the preceding description, we refer to 'some embodiments.' Note that 'some embodiments' describes a subset of all of the possible embodiments, but does not always specify the same subset of embodiments. Moreover, note that the numerical values provided are intended as illustrations of the authentication techniques. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to communicate with a second electronic device;
a computation device coupled to the interface circuit; and
memory, coupled to the computation device, configured to store program instructions and a digital asset, wherein, when executed by the computation device, the program instructions cause the electronic device to perform operations comprising:
receiving, from the electronic device and by the digital asset, a vector of challenges, wherein the vector of challenges comprises N challenges and N is a non-zero integer;
selecting, by the digital asset, a subset of the vector of challenges;
comparing, by the digital asset, the subset of the vector of challenges with a stored second subset of a second vector of challenges;
when the subset of the vector challenges matches the stored second subset of the second vector of challenges:
deeming, by the digital asset, the electronic device authenticated;
providing, from the digital asset and to the electronic device, a third vector of challenges, wherein the third vector of challenges comprises M challenges and M is a non-zero integer;
selecting, by the electronic device, a third subset of the third vector of challenges; and
storing, by the electronic device, the third subset of the third vector of challenges.

2. The electronic device of claim 1, wherein the vector of challenges and the third vector of challenges are secured based at least in part on security information.

3. The electronic device of claim 2, wherein the vector of challenges and the third vector of challenges are secured based at least in part on a biological identifier of an individual.

4. The electronic device of claim 2, wherein the security information comprises or specifies a hash function or an encryption key.

5. The electronic device of claim 1, wherein the subset of the second vector of challenges is secured based at least in part on security information.

6. The electronic device of claim 5, wherein the subset of the second vector of challenges is secured based at least in part on a biological identifier of an individual.

7. The electronic device of claim 5, wherein the security information comprises or specifies a hash function or an encryption key.

8. The electronic device of claim 1, wherein the operation comprises, prior to the receiving of the vector of challenges, selecting and storing, by the digital asset, the second subset of the second vector of challenges.

9. The electronic device of claim 1, wherein the electronic device is configured to use the stored third subset of the third vector of challenges during subsequent authentication of the digital asset.

10. The electronic device of claim 1, wherein authentication is performed between the digital asset and the electronic device for each interaction between the digital asset and the electronic device.

11. The electronic device of claim 1, wherein the digital asset comprises a digital file or a token.

12. A non-transitory computer-readable storage medium for use in conjunction with an electronic device, the computer-readable storage medium configured to store program instructions that, when executed by the electronic device, causes the electronic device to perform operations comprising:
receiving, from the electronic device and by a digital asset on the electronic device, a vector of challenges, wherein the vector of challenges comprises N challenges and N is a non-zero integer;
selecting, by the digital asset, a subset of the vector of challenges;
comparing, by the digital asset, the subset of the vector of challenges with a stored second subset of a second vector of challenges;
when the subset of the vector challenges matches the stored second subset of the second vector of challenges:
deeming, by the digital asset, the electronic device authenticated;
providing, from the digital asset and to the electronic device, a third vector of challenges, wherein the third vector of challenges comprises M challenges and M is a non-zero integer;
selecting, by the electronic device, a third subset of the third vector of challenges; and
storing, by the electronic device, the third subset of the third vector of challenges.

13. The non-transitory computer-readable storage medium of claim 12, wherein the vector of challenges and the third vector of challenges are secured based at least in part on security information and a biological identifier of an individual.

14. The non-transitory computer-readable storage medium of claim 12, wherein the subset of the second vector of challenges is secured based at least in part on security information and a biological identifier of an individual.

15. The non-transitory computer-readable storage medium of claim 12, wherein authentication is performed between the digital asset and the electronic device for each interaction between the digital asset and the electronic device.

16. A method for selectively performing authentication, comprising:

by a digital asset on an electronic device or the electronic device:

receiving, from the electronic device and by the digital asset, a vector of challenges, wherein the vector of challenges comprises N challenges and N is a non-zero integer;

selecting, by the digital asset, a subset of the vector of challenges;

comparing, by the digital asset, the subset of the vector of challenges with a stored second subset of a second vector of challenges;

when the subset of the vector challenges matches the stored second subset of the second vector of challenges:

deeming, by the digital asset, the electronic device authenticated;

providing, from the digital asset and to the electronic device, a third vector of challenges, wherein the third vector of challenges comprises M challenges and M is a non-zero integer;

selecting, by the electronic device, a third subset of the third vector of challenges; and storing, by the electronic device, the third subset of the third vector of challenges.

17. The method of claim 16, wherein the vector of challenges and the third vector of challenges are secured based at least in part on security information and a biological identifier of an individual.

18. The method of claim 16, wherein the subset of the second vector of challenges is secured based at least in part on security information and a biological identifier of an individual.

19. The method of claim 16, wherein authentication is performed between the digital asset and the electronic device for each interaction between the digital asset and the electronic device.

20. The method of claim 16, wherein the digital asset comprises a digital file or a token.

* * * * *